United States Patent [19]

Bodis et al.

[11] Patent Number: 5,039,344
[45] Date of Patent: Aug. 13, 1991

[54] ADDITIVE TO IMPROVE THE PROPERTIES OF BUILDING MATERIALS

[75] Inventors: János Bodis, Székesfehérvar; László Vörös, Gárdony; Sándor Hargitai, Agárd, all of Hungary

[73] Assignee: Sam Mozes, Brooklyn, N.Y.

[21] Appl. No.: 348,251

[22] Filed: May 4, 1989

[30] Foreign Application Priority Data

Nov. 3, 1988 [HU] Hungary ............................ 5690/88

[51] Int. Cl.$^5$ ............................................. C04B 22/04
[52] U.S. Cl. .................................. 106/641; 106/642; 106/667; 106/724
[58] Field of Search .................. 106/89, 90, 96, 314, 106/315, 641, 642, 667, 724

[56] References Cited

U.S. PATENT DOCUMENTS

| | | | |
|---|---|---|---|
| 2,259,782 | 10/1941 | Snell | 106/314 |
| 4,021,259 | 5/1977 | Komatsu et al. | 106/314 X |
| 4,082,563 | 4/1978 | Ellis et al. | 106/314 X |

*Primary Examiner*—Karl Group
*Attorney, Agent, or Firm*—Bauer & Schaffer

[57] ABSTRACT

There is described an additive composition for improving the properties of building materials, the composition comprising hydrochloric acid, aluminum, lime milk, ammonia, and oil in varying amounts and which when mixed with concrete or mortar mix provides a building material having improved properties. A process for making the additive and also for utilizing the same with concrete or mortar mix is also disclosed.

13 Claims, No Drawings

ADDITIVE TO IMPROVE THE PROPERTIES OF BUILDING MATERIALS

This invention relates to an additive composition for improving the properties of building materials, a process for making the same, improved building materials containing the same, and a process for preparing the improved building material containing the additive.

BACKGROUND OF THE INVENTION

As is well known in the construction industry, the specific strength of the building materials is of fundamental importance. The greater the strength of a given building material, the less need be used. Consequently, the weight of the material used is reduced, the construction of a given object is more quickly and less expensively accomplished, and object has greater strength. Therefore, increasing the strength of different building materials such as bricks, wall materials, panel elements, and the like is a fundamental problem.

Still further, while the construction industry has in some instances developed stronger materials for use in some areas, there is no additive compositions for improving the strength of the basic materials of construction such as, for example, concrete and mortar.

The strength of finished concrete and mortar mixes is dependent, essentially, on the quality of the concrete employed and its mixing ratio.

There exists in the construction industry a need for an additive material which significantly increases the strength of concrete and mortar mixes and which, at the same time, provides other favorable effects thereto such as accelerated bonding, safe cold bonding, and water sealing and which can be employed over a widely varying range of temperatures at ambient pressures. The present invention fulfills such a need.

BRIEF STATEMENT OF THE INVENTION

In accordance with the present invention, there is provided an additive composition for improving the properties of building materials such as concrete and mortar mixes although it is to be understood that the additive may be incorporated in other building materials in their initial form as mixes before shaping such as bricks, wall materials, panel elements and the like. The additive composition comprises, by weight, based on the total weight of the composition industrial grade, hydrochloric acid in a range of from about 50% to about 75%, milk lime in a range of from about 10% to about 30%, aluminum in a range of from about 10% to about 25%, ammonia in a range of from about 0.1% to about 0.5%, and oil in a range of from about 0.1% to about 0.3% and which, when mixed with concrete or mortar mix in the form of an aqueous mixture containing water to additive at a ratio in a range of from about 10:1 to about 1:1 and, by weight, based on the total weight of aqueous mixture and concrete or mortar mix provides an improved building material.

In accordance with the invention, there is also provided a process for a preparation of an additive composition such as that described above, comprising mixing hydrochloric acid and aluminum in the above-stated amounts, agitating the mixture at ambient temperature and pressure until the aluminum is dissolved in the acid, adding the remaining above-mentioned constituents in the above-stated amounts and agitating the fluid mixture until a substantially homogeneous additive composition is attained.

DESCRIPTION OF THE PREFERRED EMBODIMENTS

In accordance with the invention, the additive composition preferably comprises by weight, based on the total weight of the composition, hydrochloric acid in a range of from about 50% to about 75%, lime milk in a range of from about 10% to about 30%, aluminum in a range of from about 10% to about 25%, ammonia in a range of from about 0.1% to about 0.5%, and oil in a range of from about 0.1% to about 0.3%.

While the strength of any hydrochloric acid employed should be sufficient to dissolve aluminum, and hydrochloric acid of widely varying strengths may also be employed. It is preferable to use industrial strength hydrochloric acid, as a practical matter so that more rapid dissolution of the aluminum is achieved.

The aluminum employed in an additive composition according to the invention can be used in a variety of forms. For example, it may be mixed with the acid in the forms of dust, filings, granules, or chips, and the like provided the use thereof results in relatively easy dissolution of the aluminum.

In preparation of the additive composition, it is advantageous to dissolve the aluminum in the acid and then add the lime milk, oil, and ammonia successively to the mixture containing the dissolved aluminum and hydrochloric acid.

After the addition of the lime milk, it is also advantageous to let the mixture stand for at least about 50 minutes before adding the ammonia and oil thereto.

The ammonia may be employed in a wide variety of forms. For example, it may be gaseous ammonia bubbled into the mixture, but is preferably added in the form of washing soda or another detergent powder. Moreover, once all of the constituents have been added to the mixture and it has been agitated in any convenient manner such as by shaking or the like, until a substantially homogeneous mixture is attained, the additive composition is advantageously permitted to stand for at least about four (4) hours before use in a concrete or mortar mix.

Traces or very minor amounts of other materials may find their way into the additive mixture. These normally are of no consequence.

In preparing an improved building material with the above-described additive composition and concrete or mortar mix, the additive composition is generally mixed into the water to be employed in the concrete or mortar, thus forming an aqueous mixture thereof. In general, the ratio of water to additive is in a range of from about 10:1 to 1:1. For the preparation of a concrete mixture, the ratio of additive cement in the aqueous mixture is preferably about 10:1 to about 1:1, and for the preparation of a mortar mixture, the ratio is about 1:1.

In accordance with the present invention, the process for the preparation of the improved building material containing the above-described additive composition comprises mixing at ambient pressure and temperature in a range of from about the freezing point of the mixture to about the boiling point of the mixture, the concrete or mortar mix and the additive in the above-stated amounts and ratios and agitating the mixture until a substantial homogeneous building material is attained. More preferably, the temperature for so accomplishing this particular aspect of the process is in a range of from about minus 20 (−20) degrees Celcius to about +20 degrees Celcius.

Mixing the additive according to the invention with the concrete or mortar produces an endothermic reaction, thus releasing considerable amounts of heat. Consequently, bonding of both the concrete and the mortar may take place even at temperatures around minus 20 (−20) degrees Celcius. Furthermore, the development of heat obviously accelerates bonding at any temperature.

Any known cement or mortar composition premixed, mixed in situ, etc. may be used. The addition of sand or other silica fillers to the cement can also be made, and, except for the increasing bulk to the combination, sand or filler in no way effects the improvement obtained by the addition of the additive to it.

The amount of water added to the additive is generally not critical since when the cement and additive are combined, more or less water will be added, in any event, to provide a concrete or mortar composition of the correct consistency.

It is a further advantage of the present invention, primarily when mortars are formed, that it produces a water seal layer so that in a given case in practically any branch of the construction and structural engineering industries, for example hydraulic structures, flat roofs, subway construction or basements, excellent results may be obtained.

THE EXAMPLES

In order to understand the invention more fully, the following illustrative examples are set forth. In the examples all parts or percentages are by weight unless otherwise indicated.

EXAMPLE I

An additive material was prepared from:
75 kg industrial grade hydrochloric acid
20 kg lime milk
1 kg aluminum chips
0.3 kg washing soda
3 dl spindle oil
Inert non-reactive ingredient Following the dissolution of the aluminum chips in the hydrochloric acid, the lime milk was added and the composition allowed to stand for about 1 hour. The oil and the washing soda were then added to the composition.

Approximately 5 hours after the preparation of the additive concrete mixtures were prepared and structures (blocks) in accordance with the MSZ (Hungarian standard) 4715/4 made. Concrete mixtures were prepared in December, outdoors, at an approximate temperature of minus ten (−10) degrees Celcius. The additive was first mixed into water at a ratio of 10:1 to about 1:1, and the aqueous additive mixture was then added to a conventional cement and sand mixtures at a ratio of 10 parts cement or mortar to 2 parts additive.

In a parallel manner similar test specimens were made by mixing the concrete and additive at room temperature with cement compositions. The same cement compositions were mixed, without the additive, for use as control samples. The compressive strength of the finished test specimens was determined according to MSZ 4715/4 after 28 days. Results are given in the following table.

| Specimen | Test density (kg/m) | Compressive strength (MPA) |
|---|---|---|
| Control 1 | 2.307 | 23.2 |
| Control 2 | 2.316 | 23.8 |
| Control 3 | 2.316 | 22.5 |
| Example 1 a | 2.309 | 32.3 |
| Example 1 b | 2.278 | 30.2 |
| Example 1 c | 3.385 | 32.4 |

(The table was prepared on the basis of the test records of the Epitesugyi Minosegellenorzo Intezet (Construction Quality Control Institute) of 1987).

It is seen from the table that the compressive strength of the concrete test specimens prepared according to the invention is better by 36% on the average than that of the concrete customarily used.

EXAMPLE II

A basement with very wet concrete walls was insulated after construction in the following manner.

An additive material was prepared from:
5 kg industrial hydrochloric acid
3 kg lime milk
2 kg aluminum filings
10 g detergent containing ammonia
3 dl colorless machine oil Subsequently, a thin mortar was prepared from cement and sand and mixed in a ratio of 1:1 with an aqueous additive. The motor was applied in the usual manner to a concrete wall.

Following this, another insulating mortar was prepared again from cement and sand and the mixture of water and the additive of this example. The ratio of water to the additive this time was 3:1. The insulating mortar was relatively thick, similar to mortars used to cover walls. It was applied on vertical basement walls in a plurality of approximately ½ cm thick layers in several layers to provide an overall thickness of 5–6 cm.

In a third form, the basement floor was covered by the last-mentioned mortar to a thickness of 5 cm.

The application of the mortar and additive combination as secondary insulation has produced insulating layers wherein no wetness was found in the basement.

ADDITIONAL EXAMPLES

Specific examples of the inventive additives were formulated as follows:

|  | III | IV | V |
|---|---|---|---|
| Hydrochloric Acid | 50 | 55 | 65 |
| Lime Milk | 30 | 25 | 20 |
| Aluminum | 15 | 15 | 15 |
| Ammonia | 0.1 | 0.5 | 0.1 |
| Oil | 0.5 | 0.3 | 0.2 |
| Inert filler etc. | | | |

Each of Examples III, IV, and V were combined with cement and/or mortars as indicated above and used to construct cement structures, mortar layers, etc. Upon completion of drying and curing the same, favorable results were observed and obtained.

It is seen from the above that by means of the additive material according to the invention the strength of conventional concrete mixtures may be increased by more than ⅓, and a further advantage is the accelerated bonding. Still another fundamental advantage of the concrete or mortar prepared with the additive according to the invention is that it may be worked at temperatures down to minus twenty-five (−25) degrees Celcius without affecting the quality of the layer applied.

The mortar prepared with the additive according to the invention may also be used as a water in numerous applications, for example, for the post-construction insulation of basements.

Various modifications, changes, and embodiment have been disclosed herein. Others will be obvious to those skilled in the art. Accordingly, it is to be understood that the foregoing disclosure is illustrative only and not limiting of the invention.

What is claimed is:

1. An additive composition for improving the properties of building materials comprising by weight, based on the total weight of the composition, hydrochloric acid in a concentration sufficient to dissolve aluminum in a range of from about 50% to about 75%, lime milk in a range of from about 10% to about 30%, aluminum in a range of from about 10% to about 25%, ammonia in a range of from about 0.1% to about 0.5%, and oil in a range of from about 0.1% to about 0.3%.

2. The additive composition according to claim 1 comprising hydrochloric acid in a range of from about 55% to about 65%, lime milk in a range of from about 15% to about 25%, aluminum in a range of from about 8% to about 15%, ammonia in a range of from about 0.1% to about 0.4%, and oil in a range of from about 0.1 to about 0.2%.

3. The additive composition according to claim 1 comprising 65% hydrochloric acid, 20% lime milk, 15% aluminum, 0.1% ammonia, and 0.1% oil.

4. An improved concrete or mortar building material to which has been admixed an additive according to claim 1.

5. A process for the preparation of an additive composition for improving the properties of building materials comprising mixing, by weight, based on the total weight of the composition, aluminum in a range of from about 10% to about 25% and hydrochloric acid in a range of from about 50% to about 75% and agitating the mixture at ambient temperature and pressure until said aluminum is dissolved in said hydrochloric acid, adding lime milk in a range of from about 10% to about 30%, ammonia in a range of from about 0.1% to about 0.5%, and oil in a range of from about 0.1% to about 0.3% in the mixture and agitating the mixture until a substantially homogeneous additive composition is attained.

6. The process according to claim 5 wherein the mixture is allowed to stand for at least about 50 minutes before adding the ammonia or oil thereto.

7. The process according to claim 5 wherein the aluminum is employed in the form of granules.

8. The process according to claim 5 wherein the aluminum is employed in the form of chips.

9. The process according to claim 5 wherein the aluminum is employed in the form of filings.

10. The process according to claim 5 wherein the aluminum is employed in the form of dust particles.

11. The process according to claim 5 wherein the ammonia is employed in the form of washing soda.

12. The process according to claim 5 wherein the ammonia is employed in the form of a detergent powder.

13. The process according to claim 5 including allowing the mixture to stand for at least about 4 hours before use.

* * * * *